United States Patent [19]

Pestka

[11] Patent Number: 5,086,614
[45] Date of Patent: Feb. 11, 1992

[54] ENGINE POWERED SAFETY MOWER WITH SELF CLEANING DECK

[75] Inventor: Thomas J. Pestka, Ontonagon, Mich.

[73] Assignee: Mobil Oil Corporation

[21] Appl. No.: 630,528

[22] Filed: Dec. 20, 1990

[51] Int. Cl.⁵ ............................................. A01D 34/74
[52] U.S. Cl. ....................................... 56/17.2; 56/17.5;
  56/11.6; 56/11.8; 56/295; 56/320.1
[58] Field of Search ...................... 56/16.7, 17.2, 17.5,
  56/11.3, 11.5, 11.6, 11.7, 11.8, 295, 320.1, 320.2

[56] References Cited

U.S. PATENT DOCUMENTS

| | | | |
|---|---|---|---|
| 3,367,459 | 2/1968 | Rubin | 56/11.6 X |
| 4,058,957 | 11/1977 | Roseberry | 56/11.6 X |
| 4,134,249 | 1/1979 | Wuerker et al. | 56/320.1 X |
| 4,346,547 | 8/1982 | Allison | 56/17.2 X |
| 4,409,779 | 10/1983 | Bent et al. | 56/11.6 X |
| 4,840,020 | 6/1989 | Oka | 56/17.2 X |

Primary Examiner—Stephen J. Novosad

[57] ABSTRACT

A powered vegetation cutting deck adapted to be pulled by a tow vehicle which has a cylindrical deck housing with a solid top supported at its rear by a wheeled carriage. The deck has a skirt that completely surrounds flattened cutting blades under the deck so that the discharge of cut vegetation is vertical and downward with even distribution so that there are no wind rows produced. An internal combustion engine is mounted on the deck to power the cutting blades. Power is transmitted to the blades through a special pulley and a "v" belt system that features a clutch construction that allows the disconnection of the power path by a special idler and lever system. In the event of wheel or carriage damage, rear ground contact runners or skids secured to the deck enable the mower to be readily towed to a service area with the rear carriage moved to a stowed position. The skids also establish a minimum cutting height. Forward and rear adjustments are provided to allow the deck to cut evenly across the entire length of the blade or inclined for two levels of mowing.

8 Claims, 3 Drawing Sheets

ENGINE POWERED SAFETY MOWER WITH SELF CLEANING DECK

TECHNICAL FIELD

This invention relates to powered mowing machines for cutting a wide variety and range of vegetative growth and more particularly to a new and improved mowing machine that has the power and versatility to cut a wide variety of vegetation ranging from thick scrub brush to fine bladed grasses growing in a wide variety of terrains from rough rutty terrain to gently rolling or substantially flat surfaces such as on lawns without leaving wind rows of cut vegetation behind.

BACKGROUND

Prior to the present invention various powered mowers have been proposed or provided to cut rough growths of vegetation. Generally, these are specialized machines often incorporating massive flywheels and shortened blades pivoted thereto that cut in rough terrain and cut thick bushes or high patches of rough weeds or grasses. Other mowers are used in cutting fine grasses for finishing lawns, such as those found in many housing development complexes or on golf courses or the like.

Examples of such machines can be found in the following U.S. Pat. No.; 3,643,408 to Kulak et al for PROTECTIVE DEVICE FOR ROTARY MOWERS which is a heavy duty mower with specialized under shield ring for protecting the power shaft from damage from obstructions that may be encountered and U.S. Pat. No. 3,757,500 to Averitt for MULTIPLE UNIT LAWNMOWER CONSTRUCTION. While these machines have various desirable features, they do not provide a machine having the versatility of the present invention in mowing rough and heavy brush growing on rough and hilly terrain and then subsequently exhibit exceptional performance cutting fine bladed grasses in a even manner on lawns or golf courses without leaving rows of cuttings to be subsequently raked of otherwise removed.

DISCLOSURE OF THE INVENTION

This invention is drawn to a new and improved powered mower deck that can be readily pulled by a tow vehicle over a vide variety of terrain ranging from (1) rough and hilly surfaces to effectively cut dense and thick growths of brush and other vegetation and growing thereon to (2) smooth and gently rolling surfaces in which fine bladed grasses are smoothly and evenly cut.

In this invention the vegetation is cut, finely mulched and discharged in a downward vertical direction so that there are no undesired wind rows or quantities of long cut vegetation left to be subsequently raked up and removed. Furthermore, the deck and cutting blades are arranged and designed so that there is no substantive build up of vegetation sticking underneath the deck that requires scraping or other cleaning procedures.

These and other features, objects and advantages of this invention will become more apparent from the following detailed description and drawings in which:

DETAILED DESCRIPTION OF THE DRAWINGS

Figure 1:
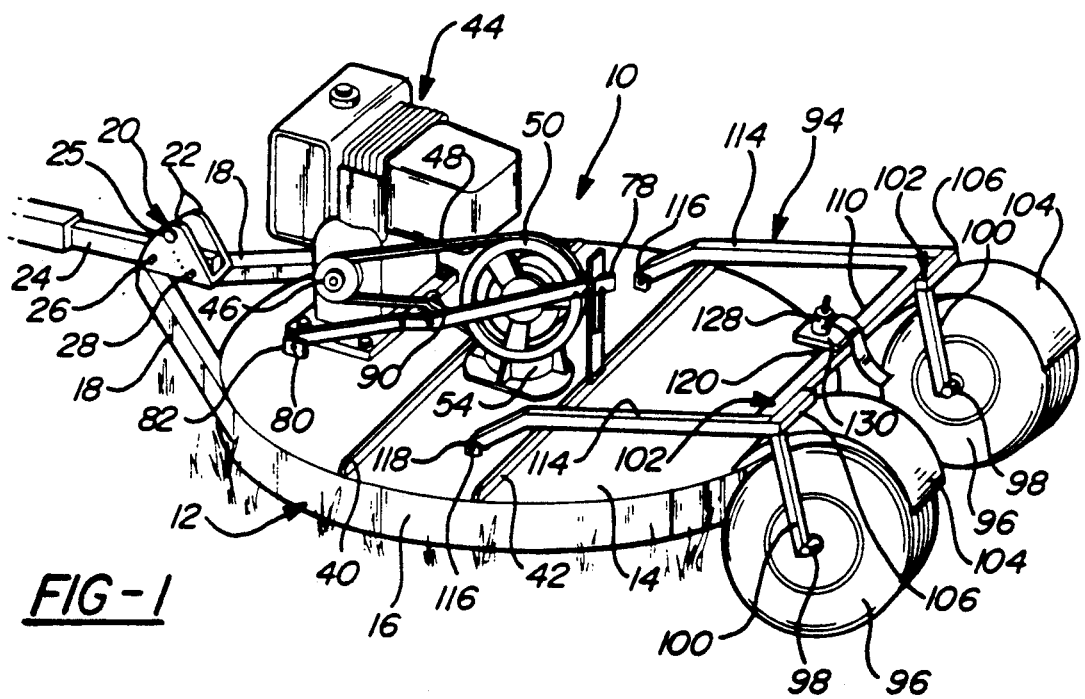
FIG. 1 is a pictorial view of the mower deck according to a preferred embodiment of this invention.

Turning now in greater detail to the drawings, there is shown in FIG. 1 an engine powered vegetation mower 10 having a steel deck 12 with a circular upper plate on top 14 and a cylindrical skirt 16 that projects downward from the peripheral edge of the top. The mower has a pair of forward and angularly disposed towing bars 18 that extend forwardly from welded attachment with the skirt 16 to a terminal intersection where they are welded or otherwise secured together. The connected ends of the towing bars have a forward adjustment bracket 20 welded to the top surfaces thereof that includes a pair of adjustment plates 22 located side by side to accommodate an elongated tubular tongue 24 and maintained parallel to one another by spacer bolt 23. The tongue 24 is secured in adjusted angular position by pivot bolt 25 and by anchor bolt 28 that extends through aligned holes in the plates and tongue. More particularly, the pivot bolt 26 establishes a horizontal pivot axis while anchor bolt 28 can be inserted through any aligned pairs of arcuate adjustment holes 30 formed in the plates 22 to adjust the angular position of the deck 12 with respect to the tow bar and the ball of the tow vehicle later described. Conventional nuts 31 thread onto the free end of the bolts as well as the spacer.

With this construction the angularity of the tongue ca be adjusted and fixed relative to the deck simply by removing the anchor bolt 28, and turning the tongue 24 to an appropriate angle, and reinserting the anchor bolt through a new selection of the arcuate holes 30 and the end hole in the tongue. The forward end of the tongue 24 carries a conventional coupling 32 with a lock and release lever 34 which can be attached to a ball of a hitch assembly 36 fixed to the rear end of a powered tractive drive vehicle 38, which is only partially illustrated in FIG. 6. By varying the angularity of the tongue, the deck can be readily tilted to a selected inclination to optimize cut of heavy underbrush. For example, with the deck being pulled in translation along a pathway the forward end of the deck is tilted upward to facilitate entry of the tall vegetation which will be initially cut by the inclined flat blading as it rotates around to the front of the skirt and the stubble of such vegetation is subsequently cut to a lower height as the blade cuts to the rear of the skirt.

The flattened upper top 14 of the deck is crossed with reinforcing ribs 40, 42 and supports a suitable internal combustion engine 44 operatively mounted thereon by suitable threaded fasteners. When operating the engine rotatably drives an output 46 that accommodates and drives a pulley "v" type drive belt 48 that extends around a drive pulley 50. The drive pulley 50 is mounted on a rotatable drive shaft 52 extending laterally from a pulley support and gear housing 54 bolted or otherwise affixed to the deck top 14.

Figure 4:
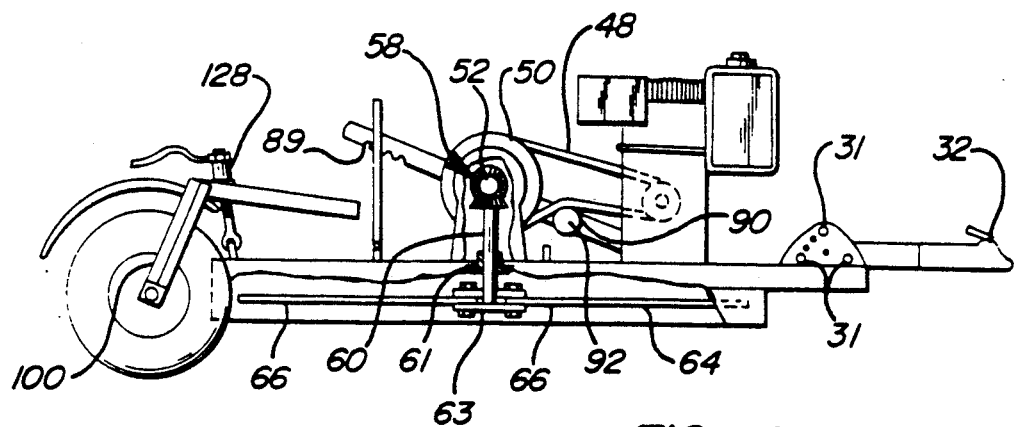
FIG. 4 is a view similar to FIG. 2 with parts broken away but showing the opposite side of the mower deck of FIG. 1.
Figure 7:
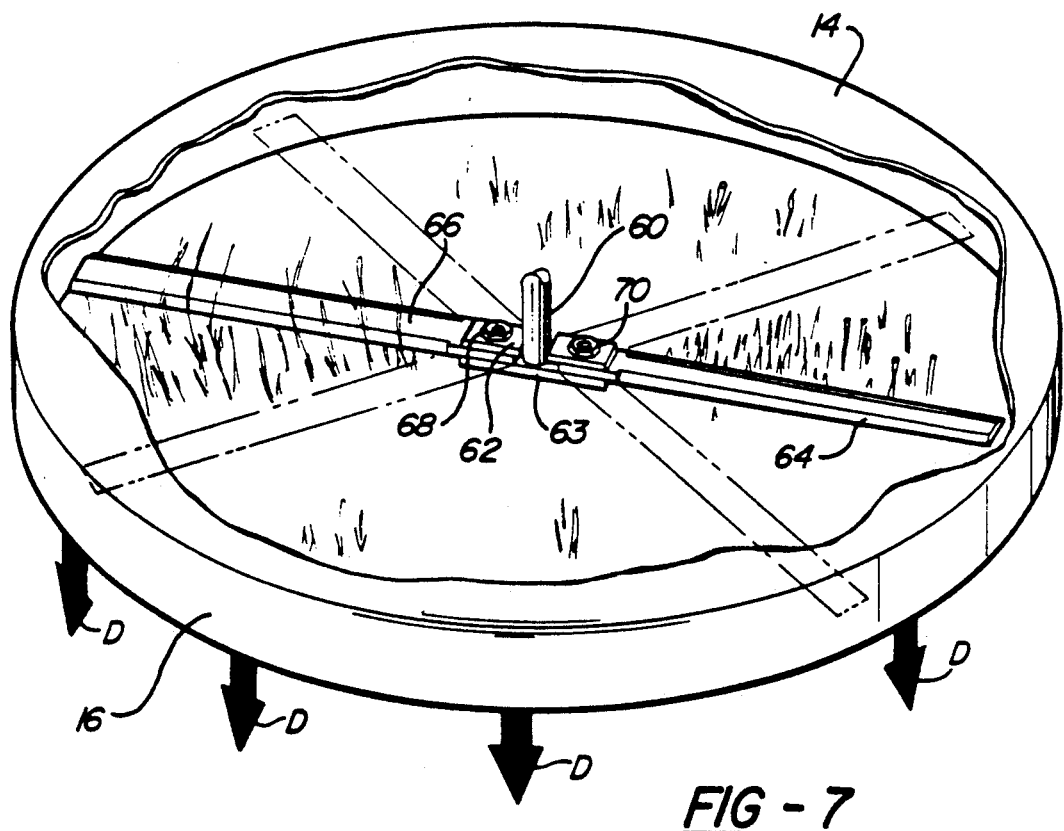
FIG. 7 is a pictorial view of a portion of the deck with parts removed and broken away illustrating mowing operation of this invention.

Drive shaft 52 drives transfer speed reducing and torque increasing gearing 58 diagrammatically illustrated in FIG. 4 that has a downward extending output shaft 60 which is journaled for rotational support in a sleeve bearing 61 fixed to the deck.

Figure 2:
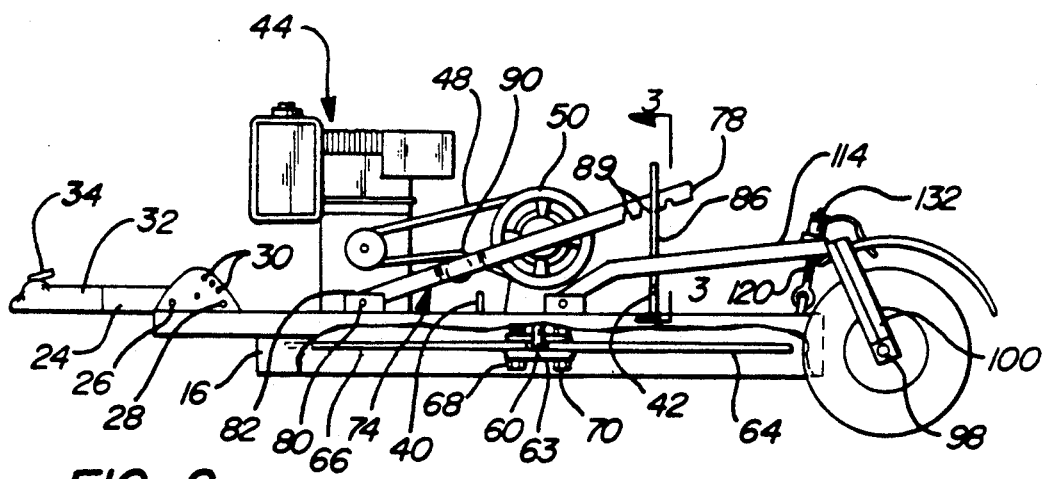
FIG. 2 is a side view of the mower deck of FIG. 1 with parts broken away.
Figure 5:
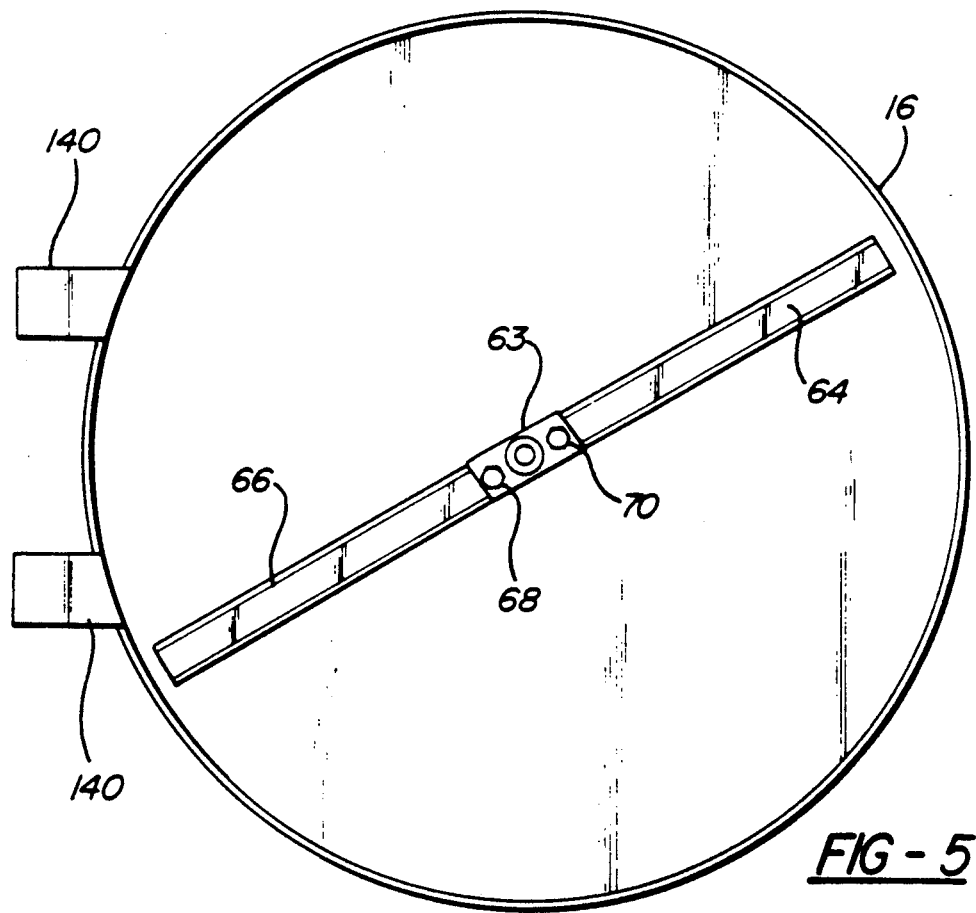
FIG. 5 is a bottom view of the mower deck of this invention illustrating the blades and with towing components of the deck removed.

As shown in FIGS. 2, 4 and 5, the lower end portion of this output shaft 60 is rigidly secured, such as by welding, to a pair of flattened blade carriers 62 and 63 of foreshortened length that extends horizontally from drive connection with the vertical extending drive shaft 60. Sandwiched between and secured to the ends of the flat blade carriers are flat first and second cutting blades 64 and 66 which are pivotally attached to the carrier by pivots 68 and 70 and, with exception of attachment areas, are edge sharpened throughout their lengths. The rotational drive of the shaft 60 and blade carriers by the engine, swings the blades 64, 66 radially outward by centrifugal force as shown in FIG. 2, 4, 5 and 7.

With this blade arrangement, any object which the blades may encounter that cannot be cut by the blades will cause them to reactively turn on their pivots in a direction opposite to the cutting direction. Resultantly, the blades, drive shaft and other drive components will be protected from bending or breakage after the obstruction has been passed. The blades will then be forced to their radial cutting position to resume their cutting function.

Figure 6:
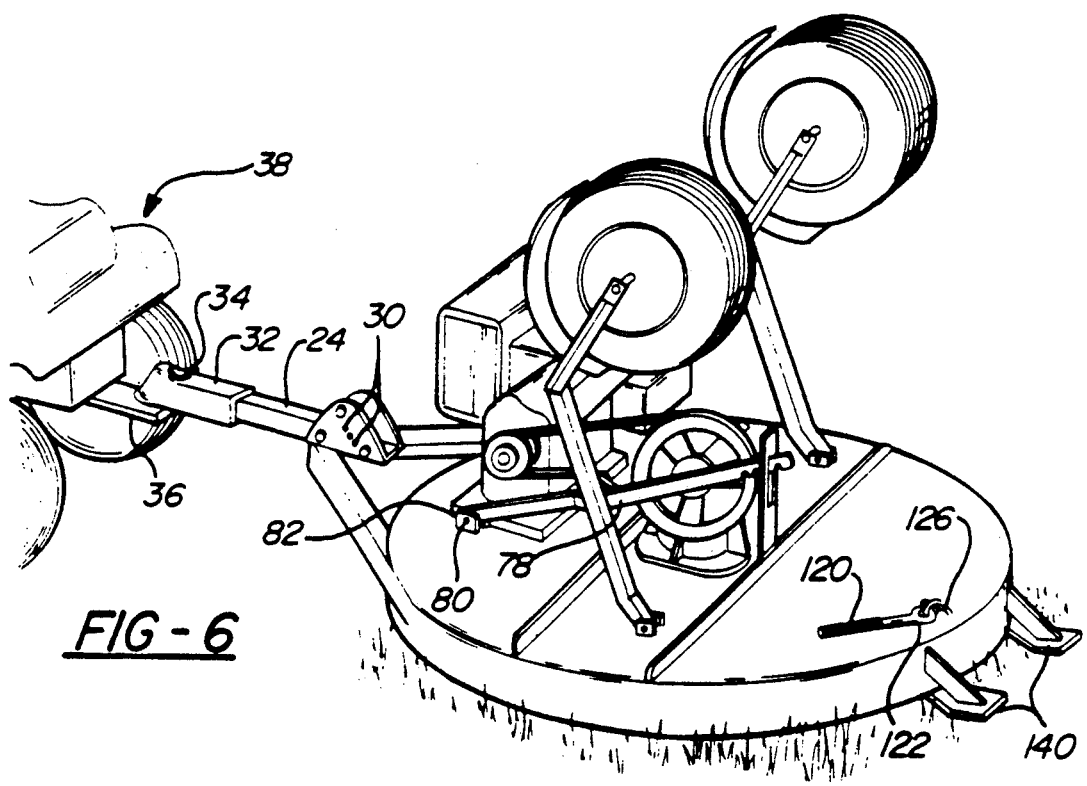
FIG. 6 is a view similar to that of FIG. 1 illustrating the mower deck, being pulled by a tow vehicle with the rear carriage in a stowed position.

FIGS. 2, 4 and 6 show a special idler pulley and clutch assembly 74 for selectively coupling and uncoupling the engine output to the cutting blade arrangement of this deck. This assembly includes an elongated arm 78, which is pivoted at its lower end by pivot 80 to an upright support 82 welded to the deck. From this pivot connection, the idler pulley and clutch arm 78 extends rearward along side the engine and the drive pulleys and then through a retainer slot 84 in retainer arm upright 86 extending from pivotal attachment at 88 with the reinforcement rib 42. The notches 89 in the lower side of arm 78 provide an adjustment whereby the tension of belt 48 can be adjusted to accommodate belt wear, when fully released the belt is unable to transmit any power to provide a convenient and economical full release of the drive clutch arrangement.

Figure 3:
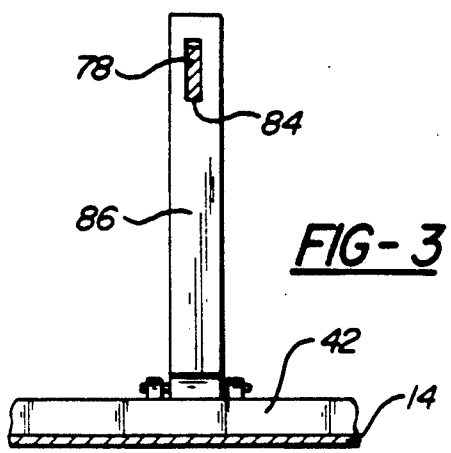
FIG. 3 is a fragmentary view taken generally along sight lines 3—3 of FIG. 2.

As shown, the arm 86 is pivoted upwardly from a rest position on the deck to an upright position so that its slot receives and engages the end of arm 78 which is manually moved to the FIG. 1 position. The arm 78 carries an idler pulley 90 rotatably mounted thereon by pivot 92. This pulley contacts the outer or flat side of the "v" belt and when the arm 78 is in its upper and locked position in its retainer slot 84, belt slack is taken up to a point in which engine drive is transmitted to the drive pulley 50 without slip. With this construction, the arm 86 can be moved to its engaged position 82 and turned downward to rest on the deck. With arm 78 turned downward on pivot 80, the idler pulley 90 is moved downward to loosen the belt and effect an interruption of the drive. To reengage this clutching system, the handle 78 is moved from the deck position back to the FIGS. 1-3 position and retainer arm 86 is swung upward into its retainer position in which the arm 78 is retained by engagement of a selected notch 89 in the lower edge of slot 84.

The mowing machine 10 is supported at its rear end by a carriage assembly 94, having a pair of laterally spaced rear wheels 96 which are mounted for rotation on laterally spaced rear axle shafts 98. These shafts extending between laterally spaced arms 100 of rear wheel support brackets 102. Arcuate fenders 104 are welded or otherwise fixed to the upper crossbar 106 of the wheel. The fenders keep the wheels from distributing or dispersing cut vegetation, mud or other material during operation. Brackets 102 are welded at their upper ends to a cross bar 110 of rear carriage. In addition to the rear wheels and their support brackets 102, the rear carriage assembly 94 includes a pair of laterally spaced arms 114 that extend forwardly from bar 110 into pivotal attachment by the pivots 116 of spaced tabs 118 that are welded or otherwise secured to the top of the deck.

Rear wheel and deck adjustment relative thereto is made through means of an elongated screw 120 having an eye 122 fixed to the top of the deck by link 124 secured to a hooped strap 126 welded to the top of the deck. The screw extends through a bushing 128 in a connector plate 130 welded to the cross bar 110 and an adjustment nut 132 is threaded on the free end thereof of the screw, as shown in FIGS. 1, 2 and 4. A handle 134 is pivotally connected to adjustment nut 132.

Rear deck height and blade cutting adjustment may be made by manually turning the handle 134 in a clockwise direction to advance the nut and raise the deck with respect to the carriage and thereby cutting height of the blades 64-66. The deck and the cutting height is lowered by turning the nut 134 to a retracted position lowering the deck relative to the rear carriage assembly and thereby cutting height of the blades.

In the event of damage to the tires or the rear carriage assembly, the handle nut and associated bushing can be removed from screw 120 and rear carriage assembly can be raised upwardly to rest position against the engine 44 as shown in FIG. 6. The mower can then be towed easily to a convenient place for repair using laterally spaced rear skids 140 welded to the rear end of the deck. In the carriage stow position, a suitable clamp or tie down chain may be used to keep the carriage in its stowed position. This also makes the mower more compact for winter storage.

In operation, the internal combustion engine of the power deck is started such as by a conventional pull start cable, not shown. The clutch and idler are then positioned in their upper FIG. 1 position so that power is transmitted through the belt and to the blades through the geared drive to the pivoted blades. As the deck is being pulled along over the cutting route, the full power of the deck engine is available to cut and mulch the vegetation encountered. With the circular skirt there is only substantial vertical downwardly discharge of the cut vegetative material. Accordingly, safety is enhanced since there can be no tangential discharge to project the discharge toward bystanders or object of valve. The blades sharpened throughout their length further cuts and mulches the vegetation, such as diagrammatically illustrated in FIG. 7. While angular velocity of the blade decreases from the cutting blade tip to the center rotational axis, there is sufficient cutting force throughout entire cutting edge to sever rough and thick growth. In this Figure and assuming the deck has been tilted for optimized cutting of rough vegetation, the blades initially sever the long brush at a predetermined height as determined by the height of the frontal arc of the blades. As the blade comes around the stubble of the brush is further cut at a lower height for a multistage cutting process. The vegetation is discharged vertically and downward. The vegetation, water and debris which is thrown tangentially of of the blades strikes the inner wall of the skirt knocks off any mud or foreign matter sticking thereto and is vertically ejected onto the ground. The blades are preferably flat and without lift edges or wings, found in many prior art constructions, so that the vegetation is not discharged upwardly for build-up onto the bottom of the deck. With the flat knife-like blades air turbulence produced by the blades is minimized, and with the deck housing defining a cylinder with a solid or closed top and open bottom, the air circulation terminates in a vertical discharge. More particularly, as diagrammatically shown by discharge arrows D, and with blade rotation and deck translation (i.e. deck travel) the cut discharge is in a pulverized state which is ejected downward leaving no wind rows of other piles of material which have to be subsequently cleaned up unless desired to provide a more finely finished appearance.

In the event a finished cut is desired such as for lawns on the fairway of a golf course, the deck adjustment are made so that the deck is level and the lower cuts finely and evenly throughout the entire cutting diameter of the blades.

While a preferred embodiment has been shown and described to illustrate the principles of this invention, other modifications will be readily apparent to those skilled in the art. Accordingly, the scope of the invention is set forth in the following claims.

I claim:

1. A powered mower for cutting vegetation ranging from areas of growths of fine blade grasses to areas of growths of thick and heavy brush including trees of a predetermined limited diameter comprising a deck having a top portion and cutting blade means mounted for rotary cutting motion beneath said top portion, a skirt depending downward from said top portion deck to peripherally encompass said cutting blade means, means for pulling said mower along a path having vegetation to be cut, a carriage extending rearward from said deck, said carriage including a pair of trailing arms extending rearwardly from attachment at their forward ends to said top portion, crossbar means extending above said deck attached to an end portion of said trailing arms, a pair of support means extending downward from connection with said cross bar means, wheel means operatively mounted to each of said support means to thereby support said deck from the rear thereof, adjustment means extending upwardly from said deck and operatively connected to said cross bar means to establish an adjusted fixed position of said deck with respect to said rear carriage, engine means supported by said deck, power transfer means operatively connecting said engine means to said cutting blade means so that said engine means can rotatably drive said cutting blade means for cutting vegetation within the area defined by said skirt and discharging said cut vegetation in a downward direction as determined by said peripheral skirt.

2. The powered mower deck of claim 1 wherein said skirt is a continuous cylinder member that completely encompasses said cutting blade means and to thereby provide a vertical ejector for discharging cut vegetation in a downward direction.

3. The deck of claim 2 wherein said deck has forwardly extending towing tongue means affixed thereto and supplemental ground contact means affixed to a rear portion of said deck to ensure a minimal height of said deck above said ground, and pivot means pivotally securing forward ends of said trailing arms to said top portion of said deck thereby allowing said carriage to be raised to a stowed position adjacent to said engine means and allowing said deck to be pulled through said towing tongue means with said supplemental ground contact means supporting said deck.

4. A mower for cutting vegetation growing from the earth comprising in combination, a support deck having an upper surface plate and having a skirt of a predetermined height extending downward with respect to the upper surface plate, blade means for cutting vegetation operatively mounted beneath said deck, support means for maintaining the deck and said blade means at a predetermined distance above the upper surface of the earth, a drive motor having an output mounted for operation on said upper plate, transmission means operatively connected to the output of said drive motor to said blade means, clutch means for connecting and disconnecting said transmission means with respect to said blade means, said clutch means including an endless drive, and manual means for positioning said endless drive so that power is selectively interrupted to said blade means, a carriage assembly secured to said deck having trailing rear wheel means affixed thereto for supporting the rear of said deck during mowing operation, front tongue means affixed to a forward portion of said deck, said tongue means including adjustment means for inclining said deck so that the forward portion of said deck tilts upward with respect to the rear portion thereof to facilitate entry of vegetation from growing areas forward of said deck to the cutting area beneath said deck.

5. The mower of claim 4 wherein said clutch means incorporates an idler pulley means, said endless drive means being a drive belt, and lever means operatively connected to said deck for moving said idler pulley to predetermined position in which said drive belt transmits power to said blade means and another position in which said belt is unable to transmit power to said blade means.

6. A powered mower for cutting vegetation ranging from areas of growths fine blade grasses to areas of growths of thick and heavy brush including trees having trunks of a predetermined limited diameter comprising a deck having a substantially solid top portion and flat cutting blade means with cutting edge means sharpened from a point near a rotational axis of the blade means to the tip thereof, said blade means being mounted for rotary cutting motion about said axis beneath said top portion, a skirt depending downward from said top portion deck to peripherally encompass said cutting bade means, said mower being adapted to be pulled along a path having vegetation to be cut, a carriage extending rearward from said deck, said carriage including a pair of trailing arms extending rearwardly from attachment at their forward ends to said top portion, crossbar means extending above said deck attached to end portion of said trailing arms, a pair support means extending downward from connection with said cross bar means, wheel means operatively mounted to each of said support means to thereby support said deck from the rear thereof, adjustment means extending upwardly from said deck and operatively connected to said cross bar means to establish an adjusted fixed position of said deck with respect to said rear carriage, engine means and associated power transfer means for driving said cutting blade for cutting vegetation within the area defined by said skirt and discharging said cut vegetation in a downward direction as determined by said peripheral skirt.

7. The powered mower deck of claim 6 wherein said skirt is a continuous cylindrical member that completely encompasses said cutting blade means and to thereby provide a vertical ejector for discharging cut vegetation in a downward direction.

8. The powered mower of claim 6 and further comprising pivot means pivotally attaching said trailing arms of said carriage to said deck, said mower having forwardly extending tongue means adapted to be attached to a tractive vehicle for pulling said mower thereby, and wherein said deck has ground contacting skid means affixed to a rearward portion thereof for contact with the ground allowing said deck to be pulled by the tractive vehicle with said rear skid means providing the rearward support of said deck.

* * * * *

UNITED STATES PATENT AND TRADEMARK OFFICE
CERTIFICATE OF CORRECTION

PATENT NO. : 5,086,614

DATED : February 11, 1992

INVENTOR(S) : Thomas J. Pestka

It is certified that error appears in the above-identified patent and that said Letters Patent is hereby corrected as shown below:

On the Cover Page:

Delete [73] Assignee: Mobil Oil Corporation
Add before the item [57] Abstract, --Attorney, Agent, or Firm --Charles A. White--.

Column 4, Line 60, delete "object" and insert --objects.
          Line 61, delete "valve" and insert --value--.
Column 5, Line 27, delete "lower" and insert --mower--.

Column 5, Line 65, delete "cylinder" and insert --cylindrical--.
Column 6, Line 57, delete "bade" and insert --blade--.

Signed and Sealed this

Sixth Day of July, 1993

Attest:

MICHAEL K. KIRK

Attesting Officer    Acting Commissioner of Patents and Trademarks